(12) United States Patent
Gaiser et al.

(10) Patent No.: US 10,934,919 B2
(45) Date of Patent: Mar. 2, 2021

(54) EXHAUST SYSTEM

(71) Applicant: Eberspächer Exhaust Technology GmbH & Co. KG, Neunkirchen (DE)

(72) Inventors: Gerd Gaiser, Reutlingen (DE); Bernd Weller, Durlangen (DE)

(73) Assignee: Eberspächer Exhaust Technology GmbH & Co. KG, Neunkirchen (DE)

(*) Notice: Subject to any disclaimer, the term of this patent is extended or adjusted under 35 U.S.C. 154(b) by 44 days.

(21) Appl. No.: 16/154,889

(22) Filed: Oct. 9, 2018

(65) Prior Publication Data
US 2019/0107026 A1    Apr. 11, 2019

(30) Foreign Application Priority Data

Oct. 10, 2017   (DE) .................... 10 2017 123 447.0

(51) Int. Cl.
| | |
|---|---|
| *F01N 3/28* | (2006.01) |
| *F01N 13/16* | (2010.01) |
| *B01F 3/04* | (2006.01) |
| *B01F 5/06* | (2006.01) |
| *F01N 3/20* | (2006.01) |

(52) U.S. Cl.
CPC ........ *F01N 3/2892* (2013.01); *B01F 3/04049* (2013.01); *B01F 5/061* (2013.01); *F01N 3/2066* (2013.01); *F01N 13/16* (2013.01); *B01F 2005/0639* (2013.01); *F01N 2240/20* (2013.01); *F01N 2510/00* (2013.01); *F01N 2610/02* (2013.01); *F01N 2610/1453* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,849,676 | B2* | 12/2010 | Witte-Merl | F01N 3/2066 60/274 |
| 7,877,983 | B2* | 2/2011 | Kunkel | B01F 3/04049 239/418 |
| 7,998,423 | B2* | 8/2011 | Boorse | B01D 53/9418 422/180 |
| 9,616,396 | B2* | 4/2017 | Nande | B01F 3/04049 |
| 10,010,873 | B2* | 7/2018 | Aoki | F01N 3/0864 |
| 10,190,466 | B2* | 1/2019 | Laurell | F01N 3/2803 |

(Continued)

FOREIGN PATENT DOCUMENTS

| | | |
|---|---|---|
| CN | 201470307 U | 5/2010 |
| CN | 102361680 A | 2/2012 |

(Continued)

*Primary Examiner* — Binh Q Tran
(74) *Attorney, Agent, or Firm* — McGlew and Tuttle, P.C.

(57) ABSTRACT

An exhaust system for an internal combustion engine, especially in a vehicle, includes an exhaust gas flow duct (14), a reactant release device (20) for the release of reactant (R) into the exhaust gas flow duct (14) and a catalytic converter device (16) downstream of the reactant release device (20). At least one part of a component surface is provided by a hydrophilic material (34) of at least one exhaust gas-carrying component (12, 22) positioned in the reactant flow path or/and defining this reactant flow path, or/and at least one part of the component surface is provided by a hydrophobic material (40) of at least one exhaust gas-carrying component (12, 18, 22) positioned in the reactant flow path.

10 Claims, 3 Drawing Sheets

(56) References Cited

U.S. PATENT DOCUMENTS

| | | | |
|---|---|---|---|
| 10,337,380 B2* | 7/2019 | Willats | F01N 3/021 |
| 10,697,342 B2* | 6/2020 | Abhyankar | F01N 3/2066 |
| 2011/0030350 A1* | 2/2011 | Kato | F01N 3/2073 |
| | | | 60/286 |
| 2016/0177801 A1* | 6/2016 | Wohlfahrt | F01N 3/2066 |
| | | | 422/168 |
| 2017/0292430 A1* | 10/2017 | Clayton, Jr. | B01D 53/9495 |
| 2019/0030498 A1* | 1/2019 | Kariya | B01F 5/0057 |

FOREIGN PATENT DOCUMENTS

| | | | | |
|---|---|---|---|---|
| CN | 105715339 A | 6/2016 | | |
| DE | 10 2009 046 129 A1 | 5/2011 | | |
| DE | 10 2010 039074 A1 | 2/2012 | | |
| DE | 10 2014 018 852 A1 | 6/2016 | | |
| EP | 2295754 A1 | 3/2011 | | |
| JP | 200576460 | * | 3/2005 | F01N 3/36 |
| JP | 2011157825 A | 8/2011 | | |
| JP | 6 081 848 B2 | 2/2017 | | |
| JP | 006081848 | * | 2/2017 | F01N 3/08 |
| WO | 2013/098306 A1 | 7/2013 | | |

\* cited by examiner

EXHAUST SYSTEM

CROSS REFERENCE TO RELATED APPLICATIONS

This application claims the benefit of priority under 35 U.S.C. § 119 of German Application 10 2017 123 447.0, filed Oct. 10, 2017, the entire contents of which are incorporated herein by reference.

TECHNICAL FIELD

The present invention pertains to an exhaust system for an internal combustion engine which can be used, for example, in a vehicle, to release exhaust gas emitted from an internal combustion engine into the environment.

BACKGROUND

In order to reduce the pollutant content of exhaust gas emitted from an internal combustion engine, especially a diesel internal combustion engine, it is known to add a reactant, for example, a urea/water solution, to the exhaust gas, in order to reduce the nitrogen oxide content in the exhaust gas in a selective catalytic reduction carried out in a catalytic converter device. The reactant fed to the exhaust gas is decomposed before carrying out the selective catalytic reduction, especially in order to provide ammonia which is needed for this reaction. Especially in case of adverse thermal conditions, i.e., for example, at low ambient temperatures or low exhaust gas temperatures, or/and high dispensing rates for the reactant, there is the risk that this decomposition proceeds incompletely or with the formation of intermediate products, which may lead to the formation of unwanted deposits on surfaces of the components carrying the exhaust gas or the reactant.

SUMMARY OF THE INVENTION

An object of the present invention is to provide an exhaust system, in which the risk of formation of deposits on exhaust gas-carrying components is reduced.

According to the present invention, this object is accomplished by an exhaust system for an internal combustion engine, especially in a vehicle, comprising an exhaust gas flow duct, a reactant release device for the release of reactant into the exhaust gas flow duct and a catalytic converter device downstream of the reactant release device, wherein at least one part of a component surface is provided by a hydrophilic material of at least one exhaust gas-carrying component positioned in the reactant flow path or/and defining this reactant flow path, or/and wherein at least one part of a component surface is provided by a hydrophobic material of at least one exhaust gas-carrying component positioned in the reactant flow path.

By providing surfaces with a material which, due to its hydrophilic character, supports the wetting of the surface and thus the distribution of the reactant impinging thereon for forming a thin film, an intensified evaporation of the reactant, especially of the water contained in the reactant and thus also a better decomposition of the reactant can be achieved. In areas, which are less suitable for such a support of the evaporation or decomposition because of the fluidic conditions, the collection of reactant and thus the formation of deposits can be prevented due to the provision of a surface with hydrophobic character.

To be able to provide such a surface characteristic in a simple manner especially in components, for example, made of metallic material, it is proposed that the hydrophilic material be provided by a material coating of at least one exhaust gas-carrying component, or/and that the hydrophobic material be provided by a material coating of at least one exhaust gas-carrying component.

For example, at least one exhaust gas-carrying component may comprise a pipe, wherein at least one part of a pipe inner surface is provided by a hydrophilic material.

In order to support the mixing of the reactant with the exhaust gas, at least one exhaust gas-carrying component may comprise a mixer with at least one, preferably with a plurality of guide blades.

In such a mixer, the evaporation or decomposition of the reactant may be supported in an especially advantageous manner by at least one part of a surface of at least one, preferably of each guide blade, which surface is on the windward (upstream) side in relation to the exhaust gas stream, being provided by a hydrophilic material. It should be pointed out here that a windward-side surface in the sense of the present invention is a surface exposed to the exhaust gas stream or the reactant stream, i.e., basically facing this stream. By providing such a hydrophilic characteristic, the reactant impinging on such a windward-oriented surface is distributed for generating a thin film and thus is easily evaporated or decomposed on such a surface.

Provisions may further be made for at least one part of a surface of at least one, preferably of each guide blade, which surface is on the leeward (downstream) side in relation to the exhaust gas stream, to be provided by hydrophobic material. In the sense of the present invention, such a leeward-side surface is oriented facing away from the exhaust gas stream or reactant stream, i.e., it forms, for example, the side of a guide blade of a mixer oriented in the downstream direction. Because flow dead spaces may form in the area of such surfaces, collection of reactant there shall be prevented, especially in order to prevent the formation of deposits.

According to a further advantageous aspect of the present invention, it is proposed that at least one, preferably each guide blade, be set at an angle in relation to an exhaust gas main flow direction and have a leading edge area as well as a discharge edge area positioned downstream in relation to the leading edge area, and that at least one part of the discharge edge area, preferably the entire discharge edge area, be provided by a hydrophobic material of at least one, preferably each guide blade set at an angle. Thus, it can be ensured that no drop-like collections of reactant can form at such a leading edge area.

Further, provisions may be made for at least one, preferably each guide blade, to be set at an angle in relation to an exhaust gas main flow direction and have a leading edge area as well as a discharge edge area positioned downstream in relation to the leading edge area, and that at least one part of the leading edge area, preferably the entire leading edge area, be provided by a hydrophobic material of at least one, preferably each guide blade set at an angle. Such a hydrophobic characteristic is especially advantageous when a surface normal of a windward-side surface of the at least one guide blade with the leading edge area provided with hydrophobic material has an angle of less than 45° in relation to an exhaust gas main flow direction.

According to an alternative embodiment, it is proposed that at least one, preferably each guide blade be set at an angle in relation to an exhaust gas main flow direction and have a leading edge area as well as a discharge edge area positioned downstream in relation to the leading edge area, and that at least one part of the leading edge area, preferably the entire leading edge area, be provided by a hydrophilic material of at least one, preferably each guide blade set at an angle, wherein such a hydrophilic characteristic in the leading edge area has an especially advantageous effect when a surface normal of a windward-side surface of the at least one guide blade with the leading edge area provided with hydrophobic material has an angle of at least 45° in relation to an exhaust gas main flow direction.

In order to further prevent the formation of deposits and support the evaporation or decomposition of reactant in exhaust systems having a complicated configuration with respect to guiding the flow, it is further proposed that in a curved area of the exhaust gas flow duct, a surface of an exhaust gas-carrying component, which surface defines the exhaust gas flow duct, be provided by a hydrophobic material in a curved inner area, or/and that in a curved area of the exhaust gas flow duct, a surface of an exhaust gas-carrying component, which surface defines the exhaust gas flow duct, be provided by a hydrophilic material in a curved outer area.

The reactant release device may be arranged in the area of a reactant release pipe connection. Because flow dead spaces may form in the interior of such a pipe, which are prone to the formation of reactant deposits, it is further proposed that an inner surface of the reactant release pipe connection be provided by a hydrophobic material in at least some areas.

Surface areas, which are not directly exposed to the exhaust gas stream or the reactant stream, are prone, in principle, to the formation of deposits. According to a further principle of the present invention, it is therefore proposed that the surface be provided with a hydrophobic material in at least one area of a surface which defines the exhaust gas flow duct with surface normal sloped in the direction of an exhaust gas main flow direction or parallel thereto and aligned therewith.

The present invention will be described below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
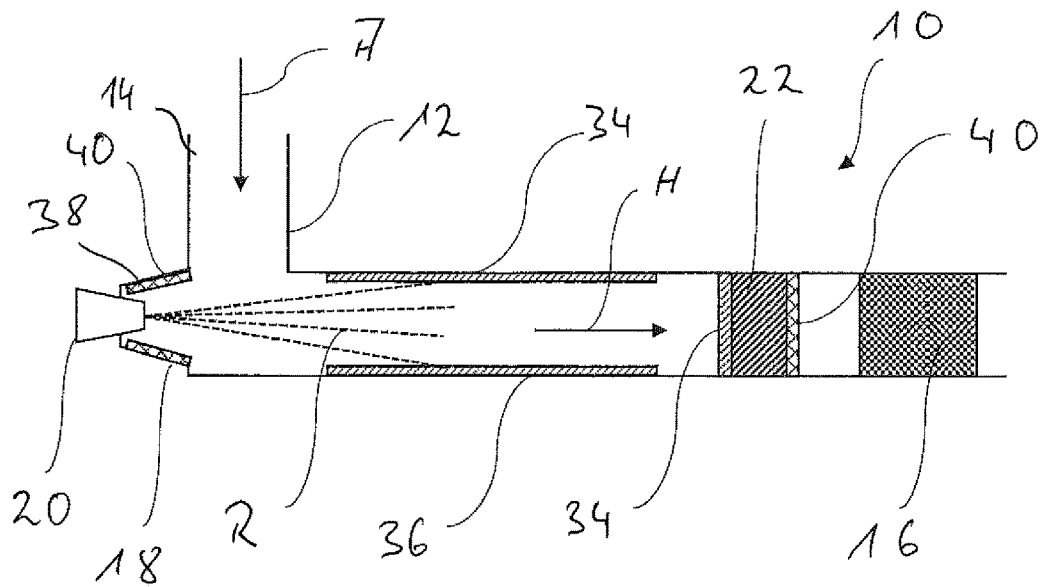
FIG. 1 is a schematic sectional view showing a partial area of an exhaust system.

Referring to the drawings, FIG. 1 shows a part of an exhaust system, generally designated by 10, of an internal combustion engine. The exhaust gas A emitted from an internal combustion engine flows in an exhaust gas duct 14 provided in a pipe 12 in the direction towards a catalytic converter device 16, for example, an SCR catalytic converter device. The pipe 12 may consist of one part or may be composed of a plurality of parts. In the pipe 12 the exhaust gas A flows along an exhaust gas main flow direction H, which may essentially also correspond to the direction of longitudinal extension of the pipe 12 in a corresponding pipe section, which may possibly also have a curved configuration.

A reactant release device 20, which is also generally called injector, is provided in the area of a reactant release pipe connection 18 provided at the pipe 12. The reactant release device 20 releases a reactant R in the form of a spray cone into the exhaust gas flow duct 14, i.e., into the pipe 12. In the pipe 12 or in the exhaust gas flow duct 14, the reactant R is mixed with the exhaust gas A, wherein the reactant R is decomposed or water is evaporated from the reactant R, to provide ammonia needed for the selective catalytic reduction to be carried out at the catalytic converter device 16.

Figure 2:
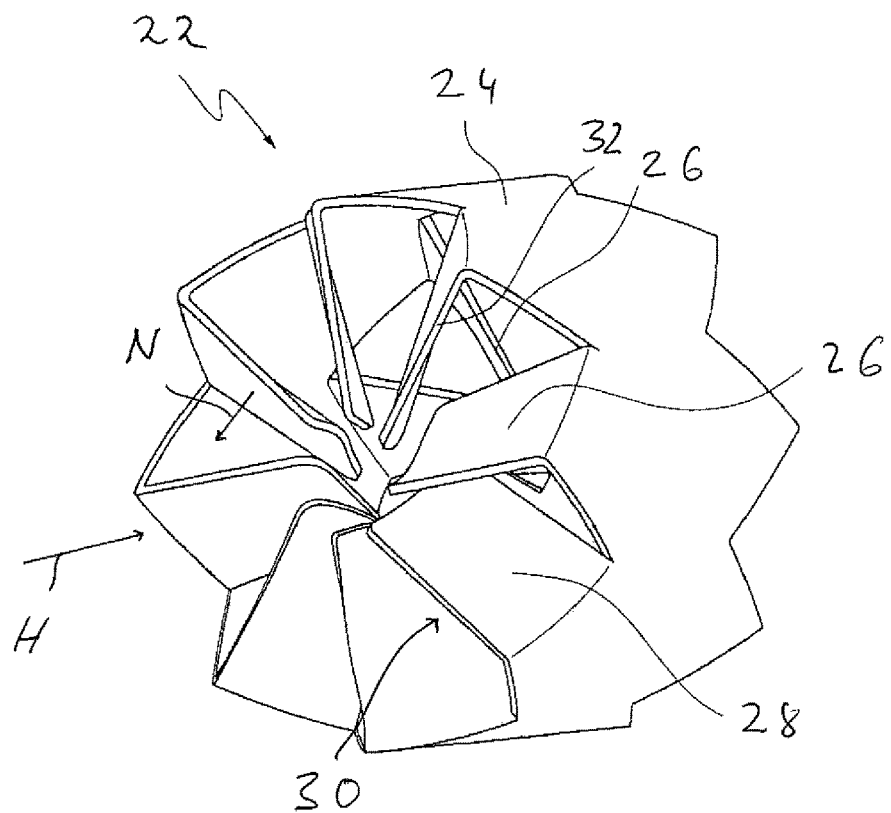
FIG. 2 is a perspective view showing a mixer providing an exhaust gas-carrying component of an exhaust system.

A mixer 22 is provided in the flow path between the reactant release device 20 and the catalytic converter device 16. The mixer 22, which basically provides an exhaust gas-carrying component, just as the pipe 12 and also the reactant release pipe connection 18, may thus be configured as shown in FIG. 2. The mixer 22 may have a ring-shaped body 24, from which respective guide blades 26 project radially inwards in an upstream end area as well as also in a downstream end area. The guide blades 26 are set at an angle in relation to the exhaust gas main flow direction H present in the area of the mixer 22 and thus have a windward-side surface 28, which is thus exposed to the exhaust gas stream or even to the reactant stream, as well as a leeward-side surface 30, which forms the rear side of the blades 26 and is thus not directly exposed to the exhaust gas stream or reactant stream. Because of the setting of the guide blades 26 at an angle in relation to the exhaust gas main flow direction H, a surface normal N of the windward-side surface 28 is bent at an angle in relation to the exhaust gas main flow direction H and arranged opposite same, which means that in case of resolution of the vector, the surface normal N has a vector component that is parallel to the exhaust gas main flow direction H and arranged opposite same. Each of the guide blades 26 set at an angle in this manner has, because of the setting at an angle, a leading edge 32 as well as a discharge edge 33, which is downstream in relation to the exhaust gas main flow direction H and is positioned in the circumferential direction offset in relation to the corresponding leading edge 32.

The reactant R released by the reactant release device 20 comes into contact with the various exhaust gas-carrying components of the exhaust system 10, i.e., especially with the pipe 12, with the reactant release pipe connection 18 and with the mixer 22, in the reactant flow path between the reactant release device 20 and the catalytic converter device 16. During this contact of the reactant R, which is generally provided by a urea/water solution, as Denoxium or the like as an alternative, with the comparatively hot exhaust gas-carrying components, the water contained in the reactant R is evaporated, on the one hand, and the urea is decomposed, on the other hand, in order to provide ammonia needed for the selective catalytic reduction. In order to support this evaporation and decomposition and to prevent the formation of deposits, especially of intermediate products forming during the decomposition of the urea, on exhaust gas-carrying components, the surfaces of at least one part of the exhaust gas-carrying components coming into contact with the reactant are formed with hydrophilic or hydrophobic characteristic according to the principles of the present invention. Thus, for example, hydrophilic material 34 is provided by a material coating 36 of the pipe 12 on its inner side in a section of the pipe 12 extending, for example, essentially linearly between the reactant release device 20 and the mixer 22. The material coating 36 made of hydrophilic material 34 is essentially provided in the entire longitudinal area of the pipe 12 extending between the reactant release device 20 and the mixer 22, so that it is guaranteed that the reactant R being released in the form of a spray cone from the reactant release device 20 can essentially only come into contact with surface areas of the pipe 12 that are coated with the material coating 36. The windward-side surfaces 28 of the guide blades 26, which surfaces are oriented in the upstream direction, may be coated at least partly with such a material coating made of hydrophilic material as well.

By providing such a hydrophilic characteristic in surface areas of exhaust gas-carrying components, it is guaranteed that the reactant impinging on these surface areas is distributed to form a thin film, as a result of which the evaporation of water, on the one hand, and the decomposition of the urea, on the other hand, are supported. Local collections are avoided. The very fast distribution of the liquid reactant R on a comparatively large surface with hydrophilic surface characteristic supports the evaporation and decomposition of the reactant already at comparatively low temperatures and even in case of comparatively large dispensed quantities of the reactant R. This in turn leads to a markedly more efficient usability of the reactant R for the selective catalytic reduction to be carried out in the catalytic converter device 16.

According to the principles of the present invention, a hydrophobic surface characteristic can be provided in areas, in which a collection of reactant shall be avoided because of the fluidic conditions. Thus, for example, the reactant release pipe connection 18 may be coated on its inner side with a material coating 38 made of a hydrophobic material 40. The reactant release pipe connection 18 basically forms a volume accessible for exhaust gas A, but essentially provides a flow dead space, so that reactant reaching this area can again be removed only with difficulty. This can be supported by the provision of a hydrophobic surface characteristic. The formation of deposits in the area of the reactant release pipe connection 18 may further be avoided by this pipe being flushed, for example, by a bypass flow surrounding the stream of the reactant R, which can be formed, for example, essentially by exhaust gas branched off from the exhaust gas stream.

For example, the leeward-side surfaces 30 of the guide blades 26, which surfaces are not directly exposed to the exhaust gas stream, may also be coated with such hydrophobic material 40 in at least some areas. Because such surfaces not directly exposed to the exhaust gas stream may basically not contribute to evaporation and decomposition of the reactant, a longer residence time of the reactant R on these surfaces would support the formation of intermediate products and unwanted deposits. This is avoided by the provision of a hydrophobic surface characteristic.

Figure 3:
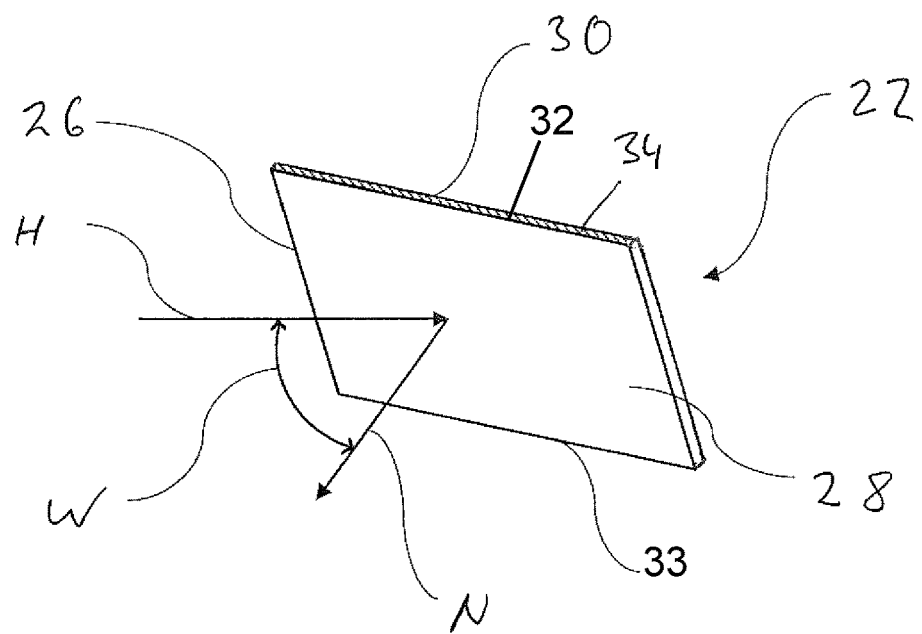
FIG. 3 is a schematic perspective view showing an area of a guide blade of the mixer from FIG. 2.

According to the principles of the present invention, the guide blades 26 may further be also provided with such hydrophilic or hydrophobic surface characteristic in the area of their leading edges 32 and their discharge edges 33, respectively. Thus, basically, for example, the discharge edges 33, against which the exhaust gas A or reactant R cannot flow directly, are provided with hydrophobic surface characteristic, for example, by the material coating there, which is suggested in a schematic diagram in FIG. 1, being provided with a hydrophobic material 40. The leading edges 32, which are directly exposed to the exhaust gas stream, may, for example, be provided with hydrophilic or hydrophobic surface characteristic as a function of the pitch angle of the guide blades 26. If the guide blades 26 are set at an angle such that an angle W, which is shown in FIG. 3, is at least 45° between a surface normal N starting from the windward-side surface 28 and the exhaust gas main flow direction H directed towards the corresponding surface, it is advantageous to provide the material coating with a hydrophilic material 34, which is shown schematically in FIG. 3, on the leading edge 32. If this angle W is smaller, especially smaller than 45°, it is advantageous to provide a hydrophobic surface characteristic in the area of the leading edges 32, for example, by applying a material coating with a hydrophobic material, in order to avoid a collection of material in this area. Because generally such guide blades 26 may be curved or/and distorted, the angle W may vary over the windward-side surface 28 of a respective guide blade 26. The angle criterion indicated above for the provision of a hydrophilic or of a hydrophobic layer of material on a respective leading edge 32 may, for example, be considered to be met when the angle W meets the corresponding criterion in the greater part of the surface, for example, in at least half of the windward-side surface 28. Further, it should be pointed out that the critical angle, which is about 45° in the above-mentioned example, may vary as a function of the configuration of a mixer. For example, this critical angle may be in the range of 40° to 50°, so that, for example, at an angle smaller than 42°, a hydrophobic surface characteristic is provided on a respective leading edge 32, while when the angle is greater than or equal to 42°, a hydrophilic surface characteristic can be provided.

Figure 4:
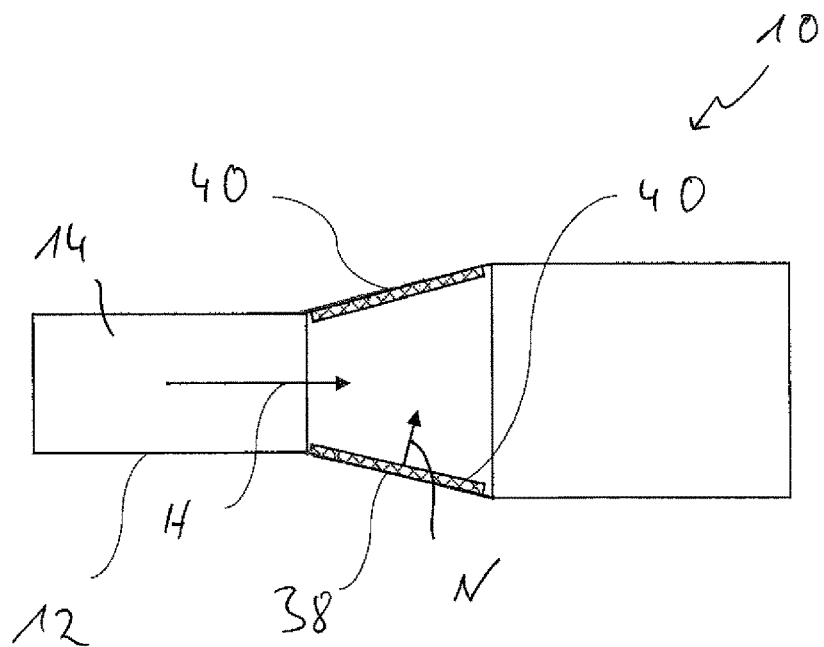
FIG. 4 is a schematic side sectional view showing a partial area of an exhaust system.

A further example of a material coating 38 with a hydrophobic material is shown in FIG. 4. FIG. 4 shows a section of an exhaust system 10, in which a, for example, frustoconical expansion of the diameter of the pipe 12 is provided. It should be noted that, of course, the section of the pipe 12 shown in FIG. 4 is a section that is positioned downstream of the reactant release device 20 and upstream of the catalytic converter device 16. It is basically seen in FIG. 4 that in the area in which the diameter of the pipe 12 increases in the flow direction, a surface normal N of the surface is bent at an angle in relation to the exhaust gas main flow direction H in this area, and is especially directed in the direction of the exhaust gas main flow direction, which means that in case of vector resolution of the surface normal N, a vector component that is parallel to the exhaust gas main flow direction H and aligned with same forms. This means that this surface area is not directly exposed to the exhaust gas stream or the reactant stream and thus basically involves the risk of formation of deposits. In order to avoid this, it is ensured by means of the material coating 38 with hydrophobic material that the reactant which is being deposited on the inner side of the pipe 12 is removed again comparatively rapidly and thus the risk of formation of deposits in a volume through which the flow is less efficient is reduced.

This principle may be extended according to the present invention to all such surface areas, whose surface normal, as is suggested in FIG. 4, is sloped in the exhaust gas main flow direction or is parallel to and aligned with same. Such areas may also form on weld seams or, for example, in the downstream end area of the mixer 22, especially of the ring-like body 24 of same. In all areas like these or in at least some such areas, provision of a hydrophobic surface characteristic is especially advantageous for avoiding deposits. Such surface areas or volume areas, which are critical with respect to the formation of deposits, may be determined, for example, in laboratory experiments or model calculations in order then to be able to provide a hydrophobic surface characteristic in areas like these or in at least some such areas.

Figure 5:
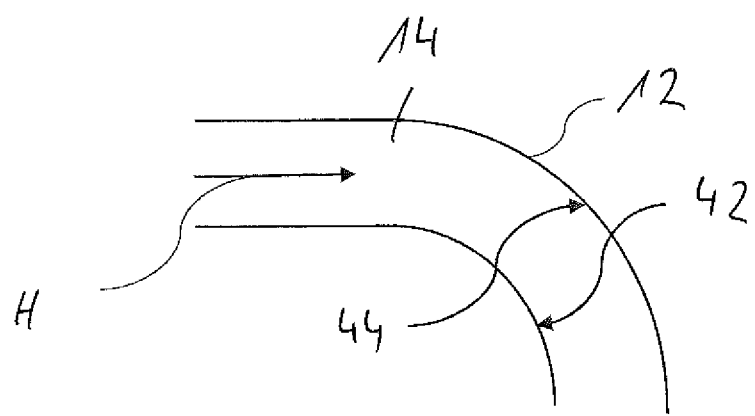
FIG. 5 is a schematic side sectional view showing a partial area of an exhaust system.

A further example is shown in FIG. 5. FIG. 5 shows a section of the exhaust gas-carrying pipe 12, in which exhaust gas flows in the exhaust gas main flow direction H. The section shown in FIG. 5 is a curved section of the pipe 12 with a curved inner area 42 and a curved outer area 44. In the curved inner area 42, the surface of the pipe 12 has a markedly smaller radius of curvature than in the curved outer area 44. During the flow through of exhaust gas, the curved inner area 42 is an area, in which, on the one hand, heat is transferred to the exhaust gas or the reactant transported in it only to a lesser extent and in which collecting reactant is removed only with difficulty because of the preferred flow along the curved outer area 44, on the other hand. Therefore, it is advantageous to provide a hydrophobic characteristic in the curved inner area 42, for example, by applying a hydrophobic material coating, while the distribution and thus also the evaporation or decomposition of the reactant on the entire surface can advantageously be supported in the curved outer area 44, i.e., the area, in which the reactant is preferably being deposited and can be removed to a comparatively great degree also due to the flow characteristic of the exhaust gas, due to provision of a hydrophilic surface characteristic, i.e., for example, by applying a hydrophilic material. In the longitudinal area lying upstream of the curved section, the pipe 12 may be provided on its inner side, as suggested in FIG. 1, with hydrophilic surface characteristic, i.e., for example, with a material coating with hydrophilic material.

Silicon dioxide nanoparticle material, for example, the material TS2229-1 produced or marketed by TitanSave, may be used as hydrophilic material. For example, organic silazane, for example, the Nanosolid™ Ultraprotect FX marketed by Xpertco, may be used as hydrophobic material. A coating material, which is so-called superhydrophobic and is applied by a sol-gel process, may also be used for the provision of a hydrophobic surface characteristic, which is also known by the general name Lotos effect. Such hydrophilic and hydrophobic material coatings may, for example, be applied to the surfaces of the exhaust gas-carrying components to be coated therewith in a spraying process as well.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine in a vehicle, the exhaust system comprising:
   an exhaust gas flow duct;
   a reactant release device configured to release reactant into the exhaust gas flow duct;
   a catalytic converter device downstream of the reactant release device; and
   an exhaust gas-carrying component positioned in the reactant flow path or defining a reactant flow path of the exhaust gas flow duct, the exhaust gas-carrying component comprising at least one component surface, the exhaust gas-carrying component comprising a mixer having at least one guide blade set at an angle in relation to an exhaust gas main flow direction and comprising a leading edge as well as a discharge edge positioned downstream in relation to the leading edge, wherein the at least one component surface is comprised of a hydrophilic material provided by a material coating or the at least one component surface is comprised of a hydrophobic material provided by a material coating, wherein:
   the leading edge of the at least one guide blade is comprised of the hydrophobic material coating, if a surface normal of an upstream-side surface of the at least one guide blade in relation to the exhaust gas stream has an angle of less than 45° in relation to an exhaust gas main flow direction, and
   the leading edge of the at least one guide blade is comprised of the hydrophilic material coating, if the surface normal of the upstream-side surface of the at least one guide blade has an angle of at least 45° in relation to an exhaust gas main flow direction.

2. An exhaust system in accordance with claim 1, wherein a further exhaust gas-carrying component comprises a pipe with at least one part of a pipe inner surface being provided by hydrophilic material.

3. An exhaust system in accordance with claim 1, wherein at least one part of the upstream side surface of the at least one guide blade is provided by hydrophilic material.

4. An exhaust system in accordance with claim 1, wherein at least one part of a surface of the at least one guide blade, which surface is on the downstream side in relation to the exhaust gas stream, is provided by a hydrophobic material.

5. An exhaust system in accordance with claim 1, wherein:
   at least one part of the discharge edge of the at least one guide blade is provided by hydrophobic material.

6. An exhaust system in accordance with claim 1, wherein:
   the surface of a further exhaust gas-carrying component defines the exhaust gas flow duct and is provided with hydrophobic material in a curved inner area; or
   the surface of a further exhaust gas-carrying component defines the exhaust gas flow duct and is provided with hydrophilic material in a curved outer area; or
   the surface of a further exhaust gas-carrying component defines the exhaust gas flow duct and is provided with hydrophobic material in a curved inner area and is provided with hydrophilic material in a curved outer area.

7. An exhaust system in accordance with claim 1, wherein:
   the reactant release device is arranged in an area of a reactant release pipe connection; and
   an inner surface of the reactant release pipe connection is provided by a hydrophobic material in at least some areas.

8. An exhaust system in accordance with claim 1, wherein:
   a further exhaust gas-carrying component is comprised by an exhaust gas flow duct part;
   a surface provided with a hydrophobic material in at least one area thereof defines the exhaust gas flow duct with a surface normal sloped in the direction of an exhaust gas main flow direction or parallel thereto and aligned therewith.

9. An exhaust system for an internal combustion engine in a vehicle, the exhaust system comprising:
   an exhaust gas flow duct;
   a reactant release device configured to release reactant into the exhaust gas flow duct;

a catalytic converter device downstream of the reactant release device; and an exhaust gas-carrying component positioned in the reactant flow path or defining a reactant flow path of the exhaust gas flow duct, the exhaust gas-carrying component comprising a mixer having at least one guide blade set at an angle in relation to an exhaust gas main flow direction, the at least one guide blade comprising an upstream-side surface, a leading edge and a discharge edge arranged downstream relative to the leading edge, wherein a surface normal of the upstream-side surface relative to an exhaust gas stream has an angle of less than forty-five degrees relative to the exhaust gas main flow direction, wherein a hydrophobic material coating is in contact with the leading edge.

10. An exhaust system for an internal combustion engine in a vehicle, the exhaust system comprising:

an exhaust gas flow duct;

a reactant release device configured to release reactant into the exhaust gas flow duct;

a catalytic converter device downstream of the reactant release device; and an exhaust gas-carrying component positioned in the reactant flow path or defining a reactant flow path of the exhaust gas flow duct, the exhaust gas-carrying component comprising a mixer having at least one guide blade set at an angle relative to an exhaust gas main flow direction, the at least one guide blade comprising an upstream-side surface, a leading edge and a discharge edge positioned downstream relative to the leading edge, wherein a surface normal of the upstream-side surface has an angle of at least forty-five degrees relative to the exhaust gas main flow direction, wherein a hydrophilic material coating is in contact with the leading edge.

* * * * *